United States Patent [19]

Deng

[11] Patent Number: 5,230,581
[45] Date of Patent: Jul. 27, 1993

[54] COUPLING APPARATUS FOR A T-SHAPED TUBE UNIT

[76] Inventor: Ming-Hui Deng, No. 132, Chien-Kuo I Rd., Hsinchuang City, Taipei Hsien, Taiwan

[21] Appl. No.: 892,071
[22] Filed: Jun. 3, 1992
[51] Int. Cl.⁵ .............................................. F16L 2/00
[52] U.S. Cl. ..................................... 403/260; 403/230
[58] Field of Search ....................... 403/260, 237, 234

[56] References Cited

U.S. PATENT DOCUMENTS 2,557,766  6/1951  Ronfeldt .............................. 403/237
4,810,144  3/1989  Martelli ........................... 403/260 X Primary Examiner—Randolph A. Reese
Assistant Examiner—Anthony Knight
Attorney, Agent, or Firm—Panitch Schwarze Jacobs & Nadel

[57] ABSTRACT

A coupling apparatus interconnects a first circular tube and a second circular tube which are perpendicular to each other so as to form a T-shaped tube unit. The coupling apparatus includes a first resilient securing member, a second resilient securing member and a bolt. Each of the first and second resilient securing members has a convex side surface, a concave side surface, a central hole and a plurality of radial projections. The first resilient securing member includes an internally threaded circular tubular projection projecting axially from a central portion thereof. The second resilient securing member includes a circular tubular projection projecting axially from a central portion of the convex side surface thereof. The first resilient securing member is first press fitted in an end portion of the first circular tube. The second resilient securing member is then press fitted in the end portion of the first circular tube to abut against the concave side surface of the first resilient securing member. The bolt extends through the hole of the second circular tube and the second resilient securing member to engage with the circular tubular projection of the first resilient securing member. The concave side surfaces of the first and second resilient securing members face toward the second circular tube.

3 Claims, 4 Drawing Sheets

COUPLING APPARATUS FOR A T-SHAPED TUBE UNIT

BACKGROUND OF THE INVENTION

1. Field of the Invention

This invention relates to an apparatus for easily interconnecting two tubes to form a T-shaped tube unit.

2. Description of the Related Art

Referring to FIG. 1, a conventional coupling apparatus includes a nut (A), which is welded into an end portion (B1) of a first circular tube (B), and a bolt (C) extending through the hole of a second circular tube (D) to engage with the threaded hole (A1) of the nut (A). To avoid the welding process, an improved coupling apparatus has been developed. Referring to FIGS. 2 and 3, the improved coupling apparatus includes a nut (D') and two resilient securing members (E) secured to two ends of the nut (D'). As illustrated, the resilient securing members (E) have a convex side surface, a concave side surface, and a plurality of radial projections (E1) so as to be press fitted in an end portion (F1) of a first circular tube (F). A bolt (G) extends through the hole of a second circular tube (H) to engage with the nut (D'). Because particular tools or machines are needed to force the assembly of the nut (D') and the resilient securing members (E) into the first circular tube (F), it is time-consuming to couple the first circular tube (F) with the second circular tube (H). The tools and machines may scratch the paint or the like on the tubes (F, H). Furthermore, because the axes of the nut (D') and the resilient securing members (E) may be on different lines, the axis of the nut (D') may be deflected from the axis of the first tube (F), changing the angle formed between the tubes (F, H).

SUMMARY OF THE INVENTION

The main object of this invention is to provide a coupling apparatus which easily interconnects two tubes to form a T-shaped tube unit in which one tube is exactly perpendicular to the other tube.

According to this invention, a coupling apparatus interconnects a first circular tube and a second circular tube which are perpendicular to each other so as to form a T-shaped tube unit. The coupling apparatus includes a first resilient securing member, a second resilient securing member and a bolt. Each of the first and second resilient securing members has a convex side surface, a concave side surface, a central hole and a plurality of radial projections. The first resilient securing member includes an internally threaded circular tubular projection projecting axially from a central portion thereof. The second resilient securing member includes a circular tubular projection projecting axially from a central portion of the convex side surface thereof. The first resilient securing member is first press fitted in an end portion of the first circular tube. The second resilient securing member is then press fitted in the end portion of the first circular tube to abut against the concave side surface of the first resilient securing member. The bolt extends through the hole of the second circular tube and the second resilient securing member to engage with the circular tubular projection of the first resilient securing member. The concave side surfaces of the first and second resilient securing members face toward the second circular tube.

BRIEF DESCRIPTION OF THE DRAWING

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
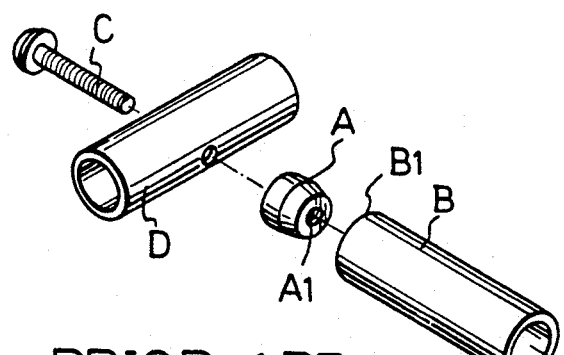
FIG. 1 is an exploded view of a T-shaped tube unit in which a conventional coupling apparatus is incorporated.
Figure 2:
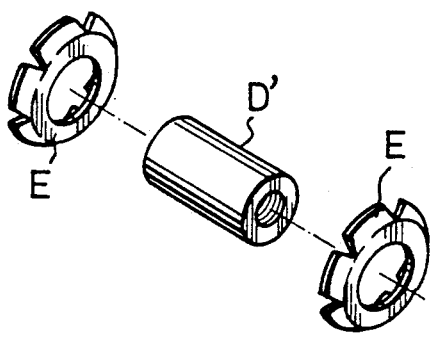
FIGS. 2 and 3 are exploded views illustrated a T-shaped tube unit in which another conventional coupling apparatus is incorporated.
Figure 3:
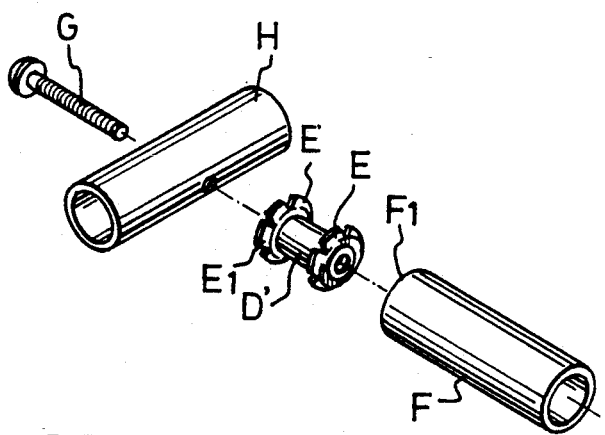
Figure 4:
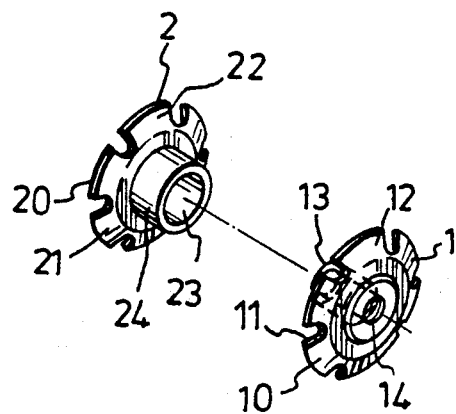
FIG. 4 is an exploded view showing the first and second resilient securing members of a coupling apparatus for a T-shaped tube unit according to the first embodiment of this invention.
Figure 5:
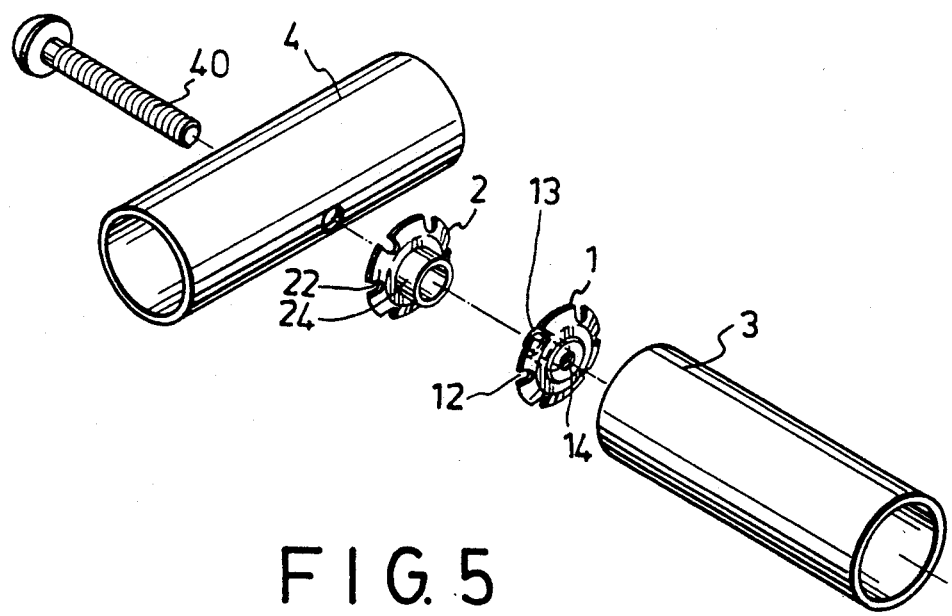
FIG. 5 is an exploded view showing the T-shaped tube unit incorporating the coupling apparatus according to the first embodiment of this invention.

Referring to FIGS. 4 and 5, a coupling apparatus of this invention includes a first resilient securing member (1), a second resilient securing member (2) and a bolt (40) and interconnects a first circular tube (3) and a second circular tube (4) so as to form a T-shaped tube unit. The first resilient securing member (1) has a convex side surface (10), a concave side surface (11), a plurality of radial projections (12) extending from the periphery of the first resilient securing member (1), an internally threaded circular tubular projection (13) extending axially from the central portion of the concave side surface (11), and a central hole (14).

The second resilient securing member (2) has a concave side surface (20), a convex side surface (21), a plurality of radial projections (22) extending from the periphery of the second resilient securing member (2), a central hole (23), and a circular tubular projection (23) extending axially from the convex side surface (21).

In this embodiment, the first and second resilient securing members (1, 2) as well as the tubes (3, 4) are made of a metal. The distal ends of the radial projections (12, 22) are spaced apart from the center of the resilient securing members (1, 2) at a distance slightly greater than half the inner diameter of the first circular tube (3). The circular tubular projection (24) of the second resilient securing member (2) has an outer diameter slightly smaller than the inner diameter of the first circular tube (3) and has an inner diameter slightly greater than the outer diameter of the circular tubular projection (13) of the first resilient securing member (1).

The first resilient securing member (1) is press fitted in the left end portion of the first circular tube (3). Subsequently, the second resilient securing member (2) is press fitted in the left end portion of the first circular tube (3) to engage the circular tubular projection (13) of the first resilient securing member (1) in the circular tubular projection (24) of the second resilient securing member (2). Because the concave side surfaces (11, 20) face toward the second circular tube (4), it is easy to push the first and second resilient securing members (1,2) manually into the first circular tube (3) without the necessity of any tools. The radial projections (12, 22) press against the inner wall of the first circular tube (3) so that it is difficult for the first and second resilient securing members (1, 2) to slide out of the first circular tube (3). Because the nut or the internally threaded circular tubular projection (13) is integrally formed with the first resilient securing member (1), it is coaxial with the first circular tube (3) so that the first circular tube (3) can exactly form an angle of 90 degrees with the second circular tube (4).

Figure 6:
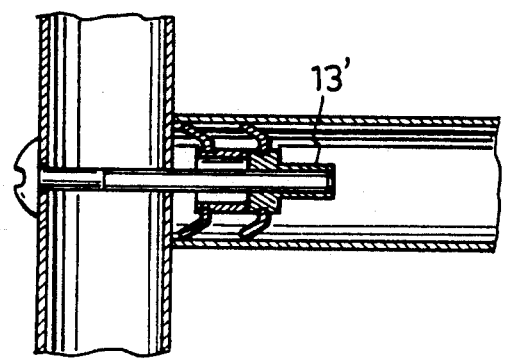
FIG. 6 is a sectional view illustrating another coupling apparatus according to the second embodiment of this invention.

Referring to FIG. 6, as an alternative form of the first resilient securing member, a circular tubular projection (13') may extend axially from the convex side surface but not from the concave side surface.

Figure 7:
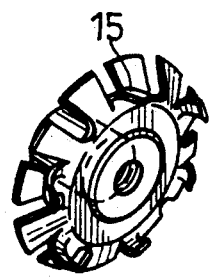
FIG. 7 is a perspective view showing the first resilient securing member of the coupling apparatus according to the third embodiment of this invention.
Figure 7A:
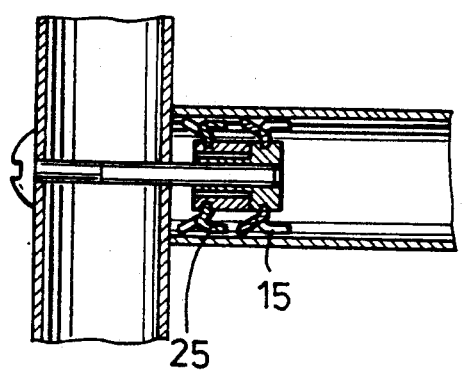
FIG. 7A is a sectional view illustrating the coupling apparatus according to the third embodiment of this invention.

Referring to FIG. 7, the periphery of the first resilient securing member may be pressed to form alternate radial projections and axial guide projections (15). The axial guide projections (15) extend from the convex side surface. As shown in FIG. 7, the second resilient securing member may also have a plurality of axial guide projections (25) having distal ends which are spaced apart from the center of the second resilient securing member at a distance slightly smaller than half the inner diameter of the first circular tube. The axial guide projection (25) of the second resilient securing member is put into the left end of the first circular tube (3) just before the second resilient securing member is pressed into the tube.

Figure 8:
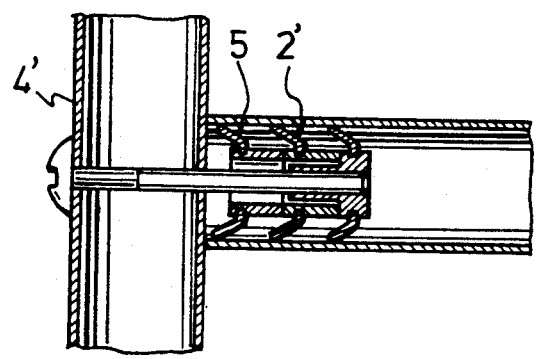
FIG. 8 is a sectional view illustrating the coupling apparatus according to the fourth embodiment of this invention.

Referring to FIG. 8, to increase the interengaging area between the coupling apparatus and the first circular tube so as to achieve firm connection of the tubes, a third resilient securing member (5) is press fitted in the first circular tube and is positioned between the second resilient securing member (2') and the second circular tube (4'). The third resilient securing member (5) is similar to the second resilient securing member (2') in construction and abuts against the same. The concave side surface of the third resilient securing member (5) faces toward the second circular tube (4').

With this invention thus explained, it is apparent that numerous modifications and variations can be made without departing from the scope and spirit of this invention. It is therefore intended that this invention be limited only as indicated in the appended claims.

I claim:

1. A coupling apparatus for a T-shaped tube unit, said T-shaped tube unit including a first circular tube having a hole formed therethrough, and a second circular tube connected securely to said first circular tube in such a manner that said first circular tube is perpendicular to said second circular tube, said coupling apparatus comprising:

a first resilient securing member having a convex side surface, a concave side surface, a central hole, an internally threaded circular tubular projection protruding axially from a central portion of one of said convex side surface and said concave side surface of said first resilient securing member, and a plurality of radial projections positioned on a periphery of said first resilient securing member, said radial projections of said first resilient securing member having distal ends which are spaced apart from center of said central hole of said first resilient securing member at a distance slightly greater than half inner diameter of said first circular tube, said first resilient securing member being press fitted in an end portion of said first circular tube in such a manner that said concave side surface of said first resilient securing member faces toward said second circular tube, said central hole of said first resilient securing member being aligned with said hold of said second circular tube;

a second resilient securing member having a convex side surface, a concave side surface, a central hole, a circular tubular projection protruding axially from a central portion of said convex side surface of said second resilient securing member, and a plurality of radial projections protruding from a periphery of said second resilient securing member, said radial projections of said second resilient securing member having distal ends which are spaced apart from center of said central hole of said second resilient securing member at a distance slightly greater than half inner diameter of said first circular tube, said second resilient securing member being press fitted in the end portion of said first circular tube in such a manner that said concave side surface of said second resilient securing member faces toward said second circular tube, said circular tubular projection of said first resilient securing member being positioned within said circular tubular projection of said second resilient securing member, said central hole of said second resilient securing member being aligned with said hole of said second circular tube; and a bolt extending through said hole of said second circular tube and said circular tubular projection of said second resilient securing member to engage threadably with said circular tubular projection of said first resilient securing member;

wherein said first resilient securing member has a plurality of axial guide projections protruding axially from a periphery of said convex side surface thereof, said axial guide projections having distal ends which are spaced apart from center of said first resilient securing member at a distance slightly smaller than half inner diameter of said first circular tube.

2. A coupling apparatus for a T-shaped tube unit, said T-shaped tube unit including a first circular tube having a hole formed therethrough, and a second circular tube connected securely to said first circular tube in such a manner that said first circular tube is perpendicular to said second circular tube, said coupling apparatus comprising:

a first resilient securing member having a convex side surface, a concave side surface, a central hole, an internally threaded circular tubular projection protruding axially from a central portion of one of said convex side surface and said concave side surface of said first resilient securing member, and a plurality of radial projections positioned on a periphery of said first resilient securing member, said radial projections of said first resilient securing member having distal ends which are spaced apart from center of said central hole of said first resilient securing member at a distance slightly greater than half inner diameter of said first circular tube, said first resilient securing member being press fitted in an end portion of said first circular tube in such a manner that said concave side surface of said first resilient securing member faces toward said second circular tube, said central hole of said first resilient securing member being aligned with said hold of said second circular tube;

a second resilient securing member having a convex side surface, a concave side surface, a central hole, a circular tubular projection protruding axially from a central portion of said convex side surface of said second resilient securing member, and a plurality of radial projections protruding from a periphery of said second resilient securing member, said radial projections of said second resilient securing member having distal ends which are spaced apart from center of said central hole of said second resilient securing member at a distance slightly greater than half inner diameter of said first circular tube, said second resilient securing member being press fitted in the end portion of said first circular tube in such a manner that said concave side surface of said second resilient securing member faces toward said second circular tube, said circular tubular projection of said first resilient securing member being positioned within said circular tubular projection of said second resilient securing member, said central hole of said second resilient securing member being aligned with said hole of said second circular tube; and a bolt extending through said hole of said second circular tube and said circular tubular projection of said second resilient securing member to engage threadably with said circular tubular projection of said first resilient securing member;

wherein said second resilient securing member has a plurality of axial guide projections protruding axially from a periphery of said convex side surface thereof, said axial guide having distal ends which are spaced apart from center of said second resilient securing member at a distance slightly smaller than half inner diameter of said first circular tube.

3. A coupling apparatus for a T-shaped tube unit, said T-shaped tube unit including a first circular tube having a hole formed therethrough, and a second circular tube connected securely to said first circular tube in such a manner that said first circular tube is perpendicular to said second circular tube, said coupling apparatus comprising:

a first resilient securing member having a convex side surface, a concave side surface, a central hole, an internally threaded circular tubular projection protruding axially from a central portion of one of said convex side surface and said concave side surface of said first resilient securing member, and a plurality of radial projections positioned on a periphery of said first resilient securing member, said radial projections of said first resilient securing member having distal ends which are spaced apart from center of said central hole of said first resilient securing member at a distance slightly greater than half inner diameter of said first circular tube, said first resilient securing member being press fitted in an end portion of said first circular tube in such a manner that said concave side surface of said first resilient securing member faces toward said second circular tube, said central hole of said first resilient securing member being aligned with said hold of said second circular tube;

a second resilient securing member having a convex side surface, a concave side surface, a central hole, a circular tubular projection protruding axially from a central portion of said convex side surface of said second resilient securing member, and a plurality of radial projections protruding from a periphery of said second resilient securing member, said radial projections of said second resilient securing member having distal ends which are spaced apart from center of said central hole of said second resilient securing member at a distance slightly greater than half inner diameter of said first circular tube, said second resilient securing member being press fitted in the end portion of said first circular tube in such a manner that said concave side surface of said second resilient securing member faces toward said second circular tube, said circular tubular projection of said first resilient securing member being positioned within said circular tubular projection of said second resilient securing member, said central hole of said second resilient securing member being aligned with said hole of said second circular tube; and a bolt extending through said hole of said second circular tube and said circular tubular projection of said second resilient securing member to engage threadably with said circular tubular projection of said first resilient securing member;

wherein a third resilient securing member is similar to said second resilient securing member in construction and is press fitted in said first circular tube between said second resilient securing member and said second circular tube, said third resilient securing member having a convex side surface from which a circular tubular projection protrudes to abut against said second resilient securing member, said bolt extending through said circular tubular projection of said third resilient securing member.

* * * * *